United States Patent
Gautier

(10) Patent No.: US 8,103,739 B1
(45) Date of Patent: *Jan. 24, 2012

(54) OPTIMIZING SERVER DELIVERY OF CONTENT BY SELECTIVE INCLUSION OF OPTIONAL DATA BASED ON OPTIMIZATION CRITERIA

(76) Inventor: Taylor S. Gautier, Oakland, CA (US)

(*) Notice: Subject to any disclaimer, the term of this patent is extended or adjusted under 35 U.S.C. 154(b) by 826 days.

This patent is subject to a terminal disclaimer.

(21) Appl. No.: 12/057,711

(22) Filed: Mar. 28, 2008

Related U.S. Application Data

(63) Continuation of application No. 11/533,312, filed on Sep. 19, 2006, now Pat. No. 7,627,646, which is a continuation of application No. 09/312,586, filed on May 14, 1999, now Pat. No. 7,127,493.

(60) Provisional application No. 60/097,333, filed on Aug. 20, 1998.

(51) Int. Cl.
*G06F 15/16* (2006.01)
*G06F 17/00* (2006.01)

(52) U.S. Cl. .......... 709/217; 707/999.019; 707/999.001; 707/999.002

(58) Field of Classification Search .................. 709/217; 707/999.01, 999.001, 999.002
See application file for complete search history.

(56) References Cited

U.S. PATENT DOCUMENTS

| | | | |
|---|---|---|---|
| 5,179,700 A | 1/1993 | Aihara et al. |
| 5,586,244 A | 12/1996 | Berry et al. |
| 5,625,668 A | 4/1997 | Loomis et al. |
| 5,625,781 A | 4/1997 | Cline et al. |
| 5,649,131 A | 7/1997 | Ackerman et al. |
| 5,649,186 A | 7/1997 | Ferguson |
| 5,706,434 A | 1/1998 | Kremen et al. |
| 5,712,899 A | 1/1998 | Pace |
| 5,740,549 A | 4/1998 | Reilly et al. |
| 5,745,865 A | 4/1998 | Rostoker et al. |
| 5,754,774 A | 5/1998 | Bittinger et al. |
| 5,761,662 A | 6/1998 | Dasan |
| 5,774,860 A | 6/1998 | Bayya et al. |
| 5,794,230 A | 8/1998 | Horadan et al. |

(Continued)

FOREIGN PATENT DOCUMENTS

WO PCT/JP97/03460 4/1998

(Continued)

OTHER PUBLICATIONS

"Intelligent User Interface Prompt Level", IBM Technical Disclosure Journal, vol. 35, No. 1A (Jun. 1992).

(Continued)

*Primary Examiner* — Van Nguyen
(74) *Attorney, Agent, or Firm* — Hamilton, Brook, Smith & Reynolds, P.C.

(57) ABSTRACT

Optimization constraints are used to select an appropriate content item from an available group of content items which are ordered in a specific manner to facilitate the proper selection of the content item, even if the exact item desired is not present. The server is then able to insert the selected content item into the outgoing content page requested by the client. The optimization constraints can be, but are not limited to, anyone of the following: communication channel performance (bandwidth), client operating system, client processor, client display capabilities, client installed software (video or audio codecs for example), and/or user preferences. A software product and method enable selective delivery of content to client devices of varying performance characteristics, including varying bandwidth, by selective filtering and inclusion of markup language content using tags demarcating optional content. An optimization constraint is used to select one of the items.

14 Claims, 3 Drawing Sheets

U.S. PATENT DOCUMENTS

| | | | |
|---|---|---|---|
| 5,796,393 | A | 8/1998 | MacNaughton et al. |
| 5,796,952 | A | 8/1998 | Davis et al. |
| 5,801,689 | A | 9/1998 | Huntsman |
| 5,801,702 | A | 9/1998 | Dolan et al. |
| 5,809,172 | A | 9/1998 | Melen |
| 5,809,248 | A | 9/1998 | Vidovic |
| 5,893,091 | A | 4/1999 | Hunt et al. |
| 5,895,471 | A | 4/1999 | King et al. |
| 5,944,768 | A | 8/1999 | Ito et al. |
| 5,959,577 | A | 9/1999 | Fan et al. |
| 6,128,668 | A | 10/2000 | Barber et al. |
| 6,167,441 | A | 12/2000 | Himmel |
| 6,314,295 | B1 | 11/2001 | Kawamoto |
| 6,598,075 | B1 | 7/2003 | Ogdon et al. |
| 7,127,493 | B1 | 10/2006 | Gautier |
| 7,627,646 | B2 | 12/2009 | Gautier |

FOREIGN PATENT DOCUMENTS

| | | |
|---|---|---|
| WO | PCT/US99/18997 | 4/2000 |

OTHER PUBLICATIONS

Shimada et al., "Interactive Scaling Control Mechanism for World Wide Web Systems", Computer Networks and ISDN Systems, No. 29, pp. 1467-1477 (1997).

Atkins et al., "Integrated Web and Telephone Service Creation", Bell Labs Technical Journal, Winter 1997, pp. 19-35.

Vitali et al., "Extending HTML in a principled way with displets", Computer Networks and ISDN Systems, No. 29, pp. 1115-1128 (1997).

"HDML 2.0 Language Reference", Unwired Planet, Inc., Version 2.0 (Jul. 1997), available at http://uplanet.com/pub/hdml2.pdf.

Office Action, U.S. Appl. No. 12/403,343, Date of mailing: Feb. 14, 2011.

```
                                    ┌ 300
┌─────────────────────────────────────────────┐
│ Directions<OPT> to our offices<OPT>:<BR>    │
│ <OPT>CONTINUE<DOPT>C</OPT><OPT> onto</OPT> HARRISON ST<OPT> │
│ --></OPT> <OPT>Go </OPT><OPT>a short distance<DOPT>short │
│ distance</OPT><OPT> and then</OPT><BR><OPT>TURN │
│ RIGHT<DOPT>R</OPT><OPT> onto</OPT> 2ND ST<OPT> --></OPT> │
│ <OPT>Go                                     │
│ </OPT>0.1 <OPT>miles<DOPT>m</OPT><OPT> and  │
│ then</OPT><BR><OPT>TURN LEFT<DOPT>L</OPT><OPT> onto</OPT> │
│ WEBSTER                                     │
│ ST<BR><OPT>CONTINUE<DOPT>C</OPT> <OPT>a short │
│ distance<DOPT>short                         │
│ distance</OPT><BR><BR><OPT>Total distance is<DOPT>Total:</OPT> 0.2 │
│ <OPT>miles<DOPT>m</OPT><OPT><BR>Estimated driving │
│ time<DOPT>,</OPT> 0.9 <OPT>minutes<DOPT>min</OPT> │
└─────────────────────────────────────────────┘
```

FIG. 3a

Compiled For Low Constraint/High Performance Device (e.g HTML)

Compiled For High Constraint/Low Performance Device (e.g TTML)

```
Directions to our offices:
CONTINUE onto HARRISON ST --> Go a short distance and then
TURN RIGHT onto 2ND ST --> Go 0.1 miles and then
TURN LEFT onto WEBSTER ST
CONTINUE a short distance Total distance is 0.2 miles
Estimated driving time 0.9 minutes
```

FIG. 3b

```
Directions
C HARRISON ST short distance
R 2ND ST 0.1 m
L WEBSTER ST
C short distance Total: 0.2 m, 0.9 min
```

FIG. 3c

OPTIMIZING SERVER DELIVERY OF CONTENT BY SELECTIVE INCLUSION OF OPTIONAL DATA BASED ON OPTIMIZATION CRITERIA

CROSS-REFERENCE TO RELATED APPLICATIONS

The present application is a continuation of U.S. Application for Letters Patent titled "Optimizing Server Delivery Of Content By Selective Inclusion Of Optional Data Based On Optimization Criteria", Ser. No. 11/533,312, filed on Sep. 19, 2006, now U.S. Pat. No. 7,627,646, which is hereby incorporated by reference herein and to which priority is claimed, and which itself is a continuation of U.S. Application for Letters Patent titled "Optimizing Server Delivery Of Content By Selective Inclusion Of Optional Data Based On Optimization Criteria", Ser. No. 09/312,586, filed on May 14, 1999, now U.S. Pat. No. 7,127,493, and which is also hereby incorporated by reference herein and to which priority is claimed, and which itself claims the benefit of U.S. Provisional Application No. 60/097,333 filed on Aug. 20, 1998.

BACKGROUND OF THE INVENTION

The present invention relates generally to systems, methods, and software products for delivering content in client-server networks, and more particularly, to systems, methods, and software products that optimize the delivery of such content in response to optimization criteria.

The Internet generally, and the World Wide Web specifically, provide a client-server model of content delivery, in which content stored on a server at a web site is delivered over a communications channel to a client device. Conventionally, the content as structured by the author is delivered by the server to all requesting clients in the same form. That is, the server does not change the structure of the content to accommodate the performance characteristics of the communication channel to a particular client, or the performance characteristics of the client itself. At best, the client re-formats the received content based on its own capabilities (e.g. a text only browser will filter out images, but still must receive the images, thereby consuming bandwidth).

This delivery model is not satisfactory when there are many different types of clients, with varying performance capabilities and varying communication channels. For example, today a web site may be accessed by many different types of clients, from conventional full size computers with large screen displays (e.g. 13" to 17") and full color capabilities (16M colors) to small handheld computers with small screens (e.g. 4" to 6") and limited color capabilities (256 colors), to cellular telephones with very small screens (1"-2") and virtually no color capabilities (2-8 colors monochrome). A web page with many images that is designed to be viewed on a full size, full color monitor will not appear at all properly on a cellular telephone display with only monochrome output. Moreover, the cellular telephone has a much lower bandwidth capability than a standard desktop computer, and thus would require significantly more time (and hence more cost and delay) in loading such a web page.

Typically, in order to accommodate these varying capabilities, a server must maintain many different web sites or web pages, each designed to be served to a particular class of client. But this approach is very labor intensive, particularly for sites that must be updated frequently, since the many different sizes and content selections for a given page must be kept in synchrony to all have the same current content. Further, display capabilities are only one characteristic that affects client performance. Different client devices may operate with different bandwidth capabilities, having different processor and memory capacities, or even have different pricing schemes associated with retrieval of content. When considering the possible combinations of factors that affect client performance, such as bandwidth and display capabilities (to name just two), the number of different possible web sites that need to be maintained quickly becomes unmanageable.

An alternative solution to maintaining multiple web sites is to design web sites that are acceptable to only the lowest performance devices that are going to access the site. But this approach yields simple sites that do not fully allow higher performance devices to take advantage of their performance features.

Accordingly, it is desirable to provide a system, method, and software product that can optimize delivery of content to client devices in response to optimization criteria. In particular, it is desirable to provide a web server that can efficiently deliver content to client devices having varying bandwidth, display, and other performance characteristics.

SUMMARY OF THE INVENTION

The present invention overcomes the limitations of the conventional systems by providing a server software product and a method that selectively delivers content to a client in response to optimization constraints indicative of the client's performance characteristics. The server delivers content such as web pages, images, text, audio, video, and any other data types to varying client devices with varying performance characteristics.

The present invention augments existing markup languages with a new tag that demarcates a group of one or more content items that may be optionally included in the content to be delivered. Where there are multiple optional items in a group, these items are alternatives for inclusion in the content, and one of the items is selected by the server for inclusion in the content based on an optimization constraint dependent on the characteristics of the client device.

Preferably, the items are ordered in a manner corresponding to some set of client characteristics; one of these items is selected as the content to be delivered when the content is requested. The characteristics may be performance characteristics of the client or communication channel, or other attributes of the client. For example, the ordering of optional content items may be with respect to highest performance to lowest performance devices, or vice versa. For example, in web page providing directions to a desired location, a group of optional content may include first an image of a map illustrating the directions, followed by a detailed text description of the directions, followed by a very short text description of the directions. Thus, each of these items is intended for different types of client devices, which can best receive and display the directions in one of these formats, and one of these forms of information will be delivered to a requesting client.

When the server is processing a client request for the document, any content that is demarcated as being optional is included in the delivered content depending on the performance characteristics of client that is requesting the content. More particularly, the server processes the items of optional content in the order in which they are demarcated together. Thus, in an embodiment in which optional items are ordered from highest to lowest performance capability, if the requesting client is a high performance device (including having a high bandwidth connection), then the first item of content is included in the document; if the requesting client is a low performance device, then the first item(s) is skipped until the appropriate item of content is reached. Obviously, the reverse of this ordering and selection process is possible. The selection of which item of content is appropriate for which client device is based on an optimization constraint. The server stores data which associates different types of client devices or performance characteristics with different levels of the optimization constraint. The number of different types of client devices or performance characteristics is not limited. The server selects the appropriate optimization constraint based on observable characteristics of the client device requesting the content. These observable characteristics include the device type, browser type, operating system, processor, memory user preferences, software installed on the client, and language type for the requested content.

A set of selection rules is used by the server to select which of the optional items of content are to be delivered to the client device based on the optimization constraint More particularly, the rules map any optimization constraint to one of the items of to content. In a preferred embodiment, where the optional items are ordered with respect to their performance demands, the optimization constraint is used as an index into these items to select the appropriate one for the client. The process may be understood as one of selectively reducing the data stream provided to a specific client based on encoding of optionally selectable/filterable data, and an optimization constraint value that controls the selection process.

The tag that demarcates optional content can obviously be any useful string. In one embodiment, the tag is usefully called the "OPT" tag. The OPT tag is formatted using standard SGML formats, with <OPT> indicating the beginning of the optional content, and terminated by </OPT> indicating the end of the optional content. Within the OPT tag there may be zero or more delimiting tags separating alternative items of optional content. The preferred delimiting tag for separating alternative items is <DOPT> for "Delimiting OPTion". A well formed OPT tag has the following form:

<OPT>content{<DOPT>alternative content}*</OPT>

Zero or more <DOPT> tags with their corresponding alternative content follow in an order, which may be from highest to lowest performance requirements, or vice versa. In the former ordering, this typically means from largest data size (e.g., length of text or use of images) to smallest data size.

EXAMPLES

1. <OPT>Real Time Stock </OPT>Quotes
2. <OPT>Turn left<DOPT>Left<DOPT>L</OPT>on First Street In the first example, the optional content "Real Time Stock" is delivered only to client devices that have no performance limitations, e.g. are not bandwidth limited, and so receive the complete text "Real Time Stock Quotes". A client device that has any optimization constraint only receives "Quotes" when this content is delivered. Thus, the unconstrained version is appropriate, for example, for a standard desktop computer, but the latter version is better supplied to a device with a very small screen or low bandwidth capabilities, such as a cellular telephone.

In the second example, of directions being given to a location, the alternative content selections become progressively smaller, being ordered left to right from least constrained (highest performance) to most constrained (lowest performance). Thus, the first item "Turn left" is delivered to a high performance client, while the last item "L" is suitable for client devices with lower bandwidth and/or smaller displays.

One preferred method of using the optimization constraint as an index into the optional items of content uses both positive and negative numbers as optimization constraints. Positive numbers index from least constrained items to most constrained items. In example 2) above, an optimization constraint of (1) would select "Turn left" while an optimization constraint of (2) would select "Left". Negative numbers index from most constrained to least; thus (−1) would select "L", which (−2) would also select "Left". Preferably, positive one (1) always selects the least constrained item, and negative one (−1) selects the most constrained item; zero (0) is treated as negative one (−1). It is a preferable rule that a negative number may never select the least constrained item, and a positive number may never select the most constrained item. With these rules, any number of optional items of content may encoded in the document and selectively delivered. Again, whether the ordering is left to right or right to left for high to low constraint is an implementation detail; which ever is used, the selection logic is implemented to match.

Using the present invention, it is possible to build a single server which is capable of serving information to multiple clients, over varying bandwidth connections, or with other varying performance characteristics.

The amount of effort required to support a growing number of clients is reduced from an order of 0(2) [for a traditional system], or a square relationship, to an order of 0(1), or a linear relationship.

This savings of effort required to maintain such a server brings the possibility of serving data to a wide range of client devices over a broad scale of bandwidth connections to a reality.

The above is a summary of a number of the unique aspects, features, and advantages of the present invention. However, this summary is not exhaustive. Thus, these and other aspects, features, and advantages of the present invention will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings:

FIGS. 3a-3c illustrates an example of an encoded content item with optional content, and different outputs of optional content according to varying levels of optimization constraint.

DETAILED DESCRIPTION OF THE INVENTION

Figure 1:
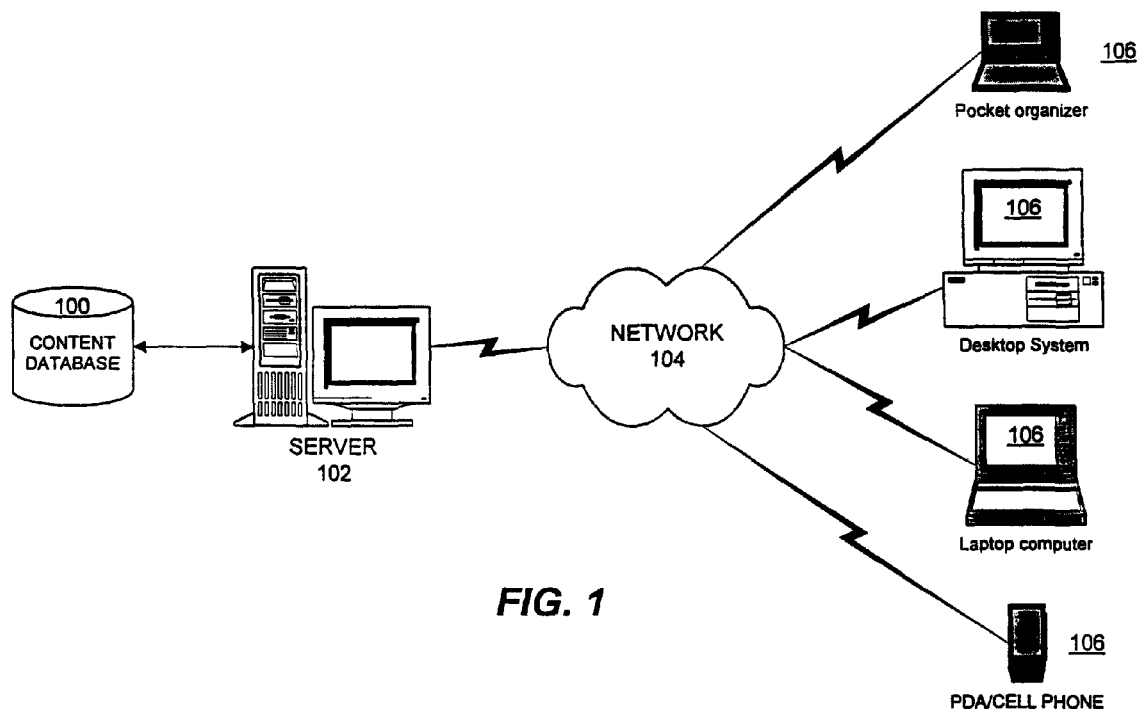
FIG. 1 is an illustration of a system in accordance with the present invention.

Referring to FIG. 1, there is shown an illustration of a system in accordance with the present invention. The system includes a server 102 and a content database 100. The server 102 of interest is the software product that executes on a conventional server grade computer, such as a workstation, minicomputer, mainframe, or the like. The server 102 is configured to execute in accordance with the functional features as described herein.

The content database 100 stores content in a suitable format, such as a markup language, ASCII, and the like. Suitable markup languages include HyperText Markup Language (HTML), Extended Markup Language (XML), Hypertext Dynamic Markup Language (HDML), Tagged Text Markup Language (TTML). The server 102 is then a server of the appropriate type of markup language, and includes functions for receiving requests for a content item, typically indicated by a uniform resource locator (URL), and parsing markup language tags, creating a content item in response to a request, and transmitting the content item to the requesting client.

Some of the content in the database 100 is structured to include at least one item of optional content demarcated by a specific markup language tag. The preferred tag is <OPT>, as described above, and its terminating tag </OPT>. Any number of alternate items of content may be enclosed, each delimited by a specific tag, such as <DOPT>. The items are preferably ordered with respect to some performance criteria, such as bandwidth capability. One ordering is from left to right, from lowest constraint, highest performance devices, to highest constraint, lowest performance devices. Schematically, a portion of content structured in this manner is as follows:

<OPT>lowest constraint data<DOPT>next lowest constraint<DOPT> . . . <DOPT> highest constraint data</OPT>.

In one embodiment, these tags are part of meta-language that itself marks up other markup languages. In this embodiment, the OPT and DOPT are set off by <<and>>, to indicate to the server 102 that they are part of the meta-language, and not part of the underlying markup language. In this manner, any number of different markup language content items are stored in the database 100, and they are marked up in the meta-language. Various different client devices use various different ones of the markup languages. Client device specific pages are thus constructed in the different markup languages. These client specific pages are marked up with the meta-language tags, and here particularly the OPT tag is used to specify optional content that can be merged or integrated into the client specific pages. In a preferred embodiment, the content within the OPT tags is variable data selected from the database 100 in response to a query; the server filters the query response using the OPT mechanism described herein. The server 102 can thus deliver content in any of the markup languages, and with any of the optionally defined content to any requesting client this allows different clients which use different markup languages to interface with the server 102.

The server 102 communicates with various types of client devices 106 over a communications network 104. The client devices 106 include desktop and laptop computers, pocket organizers, personal digital assistants, cellular telephones, and any other type of communication device adapted for Internet or Web based communications (i.e. HTTP). The server 102 selectively provides optional content from a content item, depending on an optimization constraint associated with a requesting client device 106.

Figure 2:
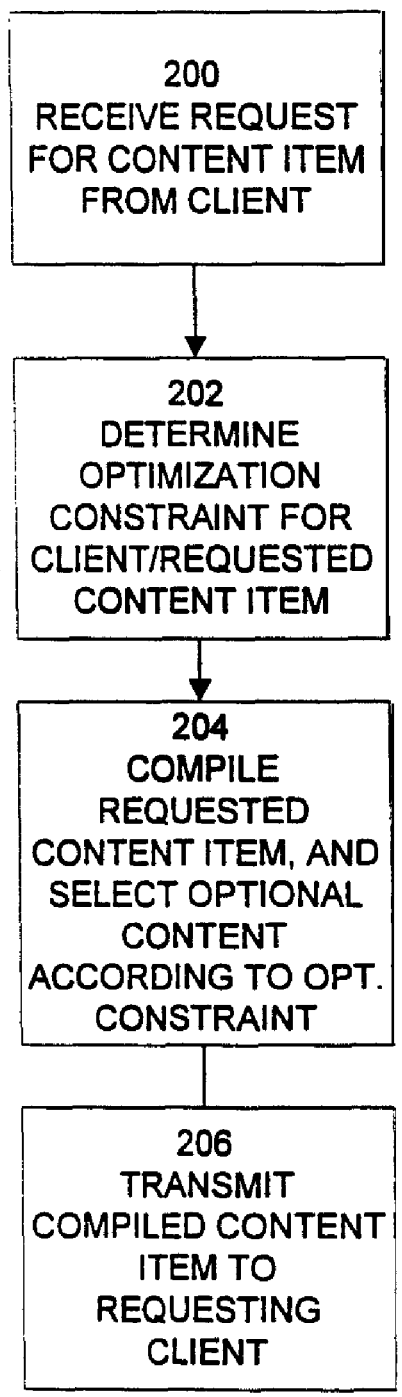
FIG. 2 is an illustration of a method of operating a server in accordance with the present invention.

Referring to FIG. 2, there is shown a method in accordance with the present invention. The server 102 receives at 200 a request for a content item from the database. The server 102 determines at 202 an optimization constraint associated with the requesting client device. The server 102 compiles at 204 the requested content item, 20 including selectively including content that is set forth as optional content, and if necessary, by selecting one of the alternate items of content, based on the optimization constraint. The server 102 then transmits, at 206 the compiled content item to the client. Determining the optimization constraint preferably includes determining either a client device type, client operating system type, client browser type, content language type of the requested content, communication bandwidth of the client, client processor, memory, user preferences, or software installed on the client or a combination of any of these or other attributes. Selecting one of the alternate items preferably includes applying a set of rules that map the optimization constraint to selected ones of the optional content items.

On set of rules uses the optimization constraint as an index, where the items are ordered in a manner corresponding to performance capabilities of the client devices. This set of rules is described as follows:

1) Determine the number of optional items. If only one is available, add a blank option as the rightmost (most constrained) option.
2) Retrieve the optimization constraint which corresponds to the client device.
3) Positive numbers select from least constrained to most constrained. Negative numbers select from most constrained to least constrained.
4) The positive number one (1) selects the least constrained item.
5) The negative number one (−1) selects the most constrained item.
6) The number zero (0) is equivalent to negative one (−1)
7) Use the optimization constraint as an index into the optional items, where 1 selects the least constrained item, 2 the second least constrained item, and so on; −1 selects the most constrained item, −2 selects the second to most constrained item and so on.
8) A negative number may never select the least constrained item.
9) A positive number may never select the most constrained item.

The following table illustrates an example mapping where there are 5 items of alternate content, using a left to right least to most constraint ordering:

TABLE I

| | $1^{st}$ Item (Least Constrained) | $2^{nd}$ Item | $3^{rd}$ Item | $4^{th}$ Item | $5^{th}$ Item (most Constrained) |
|---|---|---|---|---|---|
| Opt. Constrain n which selects this item: | n = 1 | n = 2, n <= −4 | n = (3, −3) | n >= 4, n = −2 | n = (−1, 0) |

In one embodiment, the optimization constraint is defined with respect to the markup language of the content being served. The next table defines one set of optimization constraints for this embodiment.

TABLE 2

| Language/Bandwith | Optimization Constraint |
|---|---|
| HTML (on T1 connection at 1.5 Mb/s) | 1 |
| HTML (wired modem <= 56 Kb/s) | 2 |
| HTML (wireless <= 9600 bps) | -3 |
| HDML (<9600 bps) | -2 |
| TTML | -1 |

The assignment of optimization constraints based on content language is a reflection of the typical bandwidth limitations of client devices that use the specific content language. HTML is generally used in a desktop environment where connection speeds are relatively high and display capacities are also relatively high, and thus a low constraint is appropriate, particularly for HTML on a T1 connection. HTML on a wireless device, such as a PDA is more constrained, and hence a higher constraint. HDML is generally used in a digital cellular telephone communications arena, with a transmission speed limited to 9600 bps and size of messages limited to the telephone memory, hence even more constrained environment, as reflected by the optimization constraint. TTML is generally used over GSM style SMS messages which are limited to 160 characters, and thus is the most constrained environment, and thus given a -1 optimization constraint.

As the server 102 scans an item of content it comes across an OPT encoded item 15 of data. The server 102 can determine the optimization constraint based on the markup language as in Table 2, or using any other set of rules mapping information about the client device attributes to an optimization value. The determined value is then used as an index into the items of DOPT portions, to select the appropriate item of content. This process is repeated for each OPT encoded portion of the requested content, so that the server 102 ultimately compiles a complete content item. The completed content item is transmitted to the client device.

FIGS. 3a-3c illustrate a more complex example of the present invention. Here, a content item 300 in FIG. 3a is encoded in a markup language, along with multiple portions set out as optional content between OPT tags, some of which have multiple alternate items delimited by DOPT tags. FIG. 3b illustrates the output of this content item by selection for a least constrained environment HTML over T1. Note that all of the optional text in each OPT section is included. FIG. 3c illustrates output of this same content item by selection for the most constrained items for a TTML environment. As is apparent then, a single content item may be easily structured to serve multiple different client devices, without having to maintain many different versions of the content item, as in conventional systems.

While a plurality of preferred exemplary embodiments have been presented in the foregoing detailed description, it should be understood that a vast number of variations exist, and these preferred exemplary embodiments are merely representative examples, and are not intended to limit the scope, applicability or configuration of the invention in any way. Rather, the foregoing detailed description provides those of ordinary skill in the art with a convenient guide for implementation of the invention, and contemplates that various changes in the functions and arrangements of the described embodiments may be made without departing from the spirit and scope of the invention defined by the claims thereto.

What is claimed is:

1. A method of optimizing content delivery to a client device, the method comprising:
storing content including a plurality of optional selectable content;
communicating with the client device over a communications network, different optimization constraints being associated with different classes of client devices, and the classes of client devices being associated with different performance capabilities;
determining an optimization constraint associated with the client device by determining a class of the client device to which the client device belongs based on an attribute of the client device, and by determining an optimization constraint based on the determined class; and
in response to a request for data received from the client device, determining which of the optional selectable content to transmit to the client device based on the optimization constraint by (i) employing a set of selection rules mapping optimization constraints to the optional selectable content and (ii) selecting which of the optional selectable content to deliver to the client device based on the optimization constraint associated with the client device and the selection rules, thereby selectively reducing or increasing the amount of content to be transmitted to the client device, and automatically selecting at least one of the plurality of optional selectable content based on the optimization constraint.

2. The method as in claim 1 further including:
communicating with a plurality of client devices;
determining respective optimization constraints associated with the client devices; and
determining which of the plurality optional selectable content to transmit to each of the client devices based on the corresponding optimization constraint.

3. The method as in claim 1 wherein determining an optimization constraint associated with the client device includes determining an optimization constraint based on an attribute of the client device.

4. The method as in claim 3 wherein the attribute includes a bandwidth of a connection with the client device.

5. The method as in claim 3, wherein the attribute includes a type of web browser running on the client device.

6. The method as in claim 1 wherein storing content includes storing files that include a plurality of optional selectable content representing different versions of content.

7. The method as in claim 6 wherein determining which of the optional selectable content to transmit includes automatically selecting at least one of the plurality of optional selectable content based on the optimization constraint.

8. The method as in claim 1 wherein determining which of the optional selectable content to transmit includes, in an event the class of the client device is a class associated with a low-performance capability, selecting optional selectable content that requires a least amount of bandwidth to be transmitted.

9. A non-transitory computer-readable medium for use in a system having a server for storing content data, and which is connected to a plurality of client devices, the non-transitory computer-readable medium storing instructions which cause the server to:
store non-optional content data and optional content data, the optional content data including a plurality of optional content items, each optional content item being associated with an operating characteristic corresponding to operating characteristics of client devices;

receive a request for content data from a client device;

determine a class of client device to which the client device belongs based on the request, classes of client devices being associated with optimization constraints;

associate one of the optimization constraints to the received request for content data based on the determined class of client device to which the client device belongs;

automatically select the non-optional content data, and automatically select at least one of the plurality of optional content items that corresponds to the received request for content data by selecting a content item corresponding to the optimization constraint; and transmit the selected non-optional content data and the selected optional content item to the client device.

10. The non-transitory computer-readable medium as in claim 9 wherein (i) optimization constraints are associated with each content item, (ii) the optimization constraints index classes of client devices, (iii) each class of client device has different operating characteristics, and (iv) the stored instructions further cause the processor to:

associate one of the optimization constraints with the received request for content data based on the operating characteristics of the client device; and select a content item based on the optimization constraint.

11. The non-transitory computer-readable medium as in claim 10 wherein the stored instructions further cause the processor to:

determine a connection type in use by the client device; and associate with the received request for content data an optimization constraint based on the connection type.

12. The non-transitory computer-readable medium as in claim 9 wherein the client device operating characteristics are selected from the group consisting of:

client device operating system, client device browser type, connection type, connection speed, central processor type, graphics processor type, amount of main memory, amount of graphics memory, user preferences, display size, and software installed.

13. A method of optimizing content delivery to a client device, the method comprising:

accessing content including a plurality of optional selectable content in files representing different versions of content;

communicating with a plurality of client devices over a communications network;

determining respective optimization constraints associated with the client devices based on attributes of the client devices, the attributes including a bandwidth of a connection with the client device or a type of web browser running on the client device; and in response to a request for data received from the client device, determining which of the optional selectable content to transmit to each of the client devices based on the corresponding optimization constraint by (i) employing a set of selection rules mapping optimization constraints to the optional selectable content and (ii) selecting which of the optional selectable content to deliver to the client device based on the optimization constraint associated with the client device and the selection rules, thereby selectively reducing or increasing the amount of content to be transmitted to the client device, and automatically selecting at least one of the plurality of optional selectable content based on the optimization constraint.

14. A method of optimizing content delivery to a client device, the method comprising:

accessing content including a plurality of optional selectable content;

communicating with the client device over a communications network, different optimization constraints being associated with different classes of client devices, and the classes of client devices being associated with different performance capabilities;

determining an optimization constraint associated with the client device by determining a class of the client device to which the client device belongs based on an attribute of the client device, and by determining an optimization constraint based on the determined class; and in response to a request for data received from the client device, determining which of the optional selectable content to transmit to the client device based on the optimization constraint by (i) employing a set of selection rules mapping optimization constraints to the optional selectable content and (ii) selecting which of the optional selectable content to deliver to the client device based on the optimization constraint associated with the client device and the selection rules, thereby selectively reducing or increasing the amount of content to be transmitted to the client device, and automatically selecting at least one of the plurality of optional selectable content based on the optimization constraint.

* * * * *